(12) United States Patent
Yano et al.

(10) Patent No.: US 7,499,087 B2
(45) Date of Patent: Mar. 3, 2009

(54) NOISE REDUCING DEVICE AND NOISE REDUCING METHOD

(75) Inventors: Shuji Yano, Osaka (JP); Takeshi Hamasaki, Osaka (JP)

(73) Assignee: Panasonic Corporation, Osaka (JP)

( * ) Notice: Subject to any disclaimer, the term of this patent is extended or adjusted under 35 U.S.C. 154(b) by 446 days.

(21) Appl. No.: 10/493,870

(22) PCT Filed: Jun. 11, 2003

(86) PCT No.: PCT/JP03/07387

§ 371 (c)(1),
(2), (4) Date: Nov. 17, 2004

(87) PCT Pub. No.: WO03/107659

PCT Pub. Date: Dec. 24, 2003

(65) Prior Publication Data

US 2005/0068430 A1    Mar. 31, 2005

(30) Foreign Application Priority Data

Jun. 13, 2002    (JP) .............................. 2002-172308

(51) Int. Cl.
*H04N 5/217*    (2006.01)
(52) U.S. Cl. .................................... 348/241
(58) Field of Classification Search ................. 348/241
See application file for complete search history.

(56) References Cited

U.S. PATENT DOCUMENTS 6,016,356 A * 1/2000 Ito et al. ..................... 382/132

(Continued)

FOREIGN PATENT DOCUMENTS

JP    62-008532    7/1988

(Continued)

OTHER PUBLICATIONS

Search Report For Corresponding Application No. GB0520959.8 dated Nov. 23, 2005.

(Continued)

*Primary Examiner*—James M Hannett
(74) *Attorney, Agent, or Firm*—RatnerPrestia

(57) ABSTRACT

A conventional three-dimensional noise reducing device is defective in that after-image degradation increases when effective noise reduction is performed on a signal whose noise level has been increased by signal amplification.

The following are provided: an AGC circuit 12 amplifying a video signal; a high frequency coring circuit 14 splitting the video signal amplified by the AGC circuit 12 into a plurality of bands in accordance with the spatial frequency thereof, reducing the level of a higher frequency component of the video signal based on a comparison between a first characteristic parameter based on the factor of amplification of the amplifying means and the level of the higher frequency component, and synthesizing the reduced higher frequency component and a component of another band with each other; a subtracter 15 extracting the difference signal between the output of the high frequency coring circuit 14 and a predetermined reference signal; a nonlinear processing circuit 16 reducing the level of the difference signal based on a comparison between the level of the difference signal and a predetermined second characteristic parameter; and a subtracter 17 subtracting the output of the nonlinear processing circuit from the video signal.

12 Claims, 12 Drawing Sheets

U.S. PATENT DOCUMENTS

| | | | |
|---|---|---|---|
| 6,611,287 B1 * | 8/2003 | Yamamoto et al. | 348/222.1 |
| 6,975,354 B2 * | 12/2005 | Glotzbach et al. | 348/273 |
| 2002/0159351 A1 * | 10/2002 | Tateishi | 369/47.45 |

FOREIGN PATENT DOCUMENTS

| | | |
|---|---|---|
| JP | 63-176073 | 7/1988 |
| JP | 2-92268 | 7/1990 |
| JP | 170995/1988 | 7/1990 |
| JP | 03-079168 | 4/1991 |
| JP | 3-79168 | 4/1991 |
| JP | 06-178163 | 6/1994 |
| JP | 6-178163 | 6/1994 |
| JP | 2000-196916 | 7/2000 |

OTHER PUBLICATIONS

International Search Report corresponding to application No. PCT/JP03/07387 dated Oct. 28, 2003.

* cited by examiner

US 7,499,087 B2

NOISE REDUCING DEVICE AND NOISE REDUCING METHOD

This Application is a U.S. National Phase Application of PCT International Application PCT/JP03/07387.

TECHNICAL FIELD

The present invention relates to a noise reducing device, a noise reducing method and the like used for video apparatuses such as television sets and video cassette recorders.

BACKGROUND ART

A noise reducing device for achieving high image quality in video apparatuses will be described. Examples of the noise reducing device include a two-dimensional noise reducing device reducing noise based on a signal in the same field or frame and a three-dimensional noise reducing device obtaining a signal difference between fields or frames by use of a memory or the like and reducing noise based on the difference (for example, see Japanese Laid-Open Patent Application No. H03-79168).

First, the operation of a conventional three-dimensional noise reducing device will briefly be described.

FIG. 9 shows an example of the structure of an image forming apparatus having the conventional three-dimensional noise reducing device.

In FIG. 9, reference numeral 101 represents a solid-state image sensing device (hereinafter, referred to as CCD) converting incident light into an electric video signal. Reference numeral 102 represents an automatic gain control amplifier circuit (hereinafter, referred to as AGC circuit) performing amplification so that the output signal level is maintained constant even when the output signal from the CCD 101 is changed. Reference numeral 103 represents an analog-to-digital converter (hereinafter, referred to as A/D converter) converting the analog video signal from the AGC circuit 102 into a digital video signal. Reference numeral 104 represents a subtracter performing a subtraction of one input signal from the other input signal. Reference numeral 105 represents a nonlinear processing circuit performing nonlinear processing on the output of the subtracter 104. Reference numeral 106 represents a subtracter subtracting the output of the nonlinear processing circuit 105 from the output signal of the A/D converter 103 for outputting a video signal SO. Reference numeral 107 represents a field memory outputting the output video signal SO to the subtracter 104 as a reference signal delayed by one field. Reference numeral 108 represents a nonlinear processing control circuit changing the characteristic of the nonlinear processing circuit 105 in accordance with the factor of amplification of the AGC circuit 102.

The operation of the conventional three-dimensional noise reducing device having the above-described structure will be described.

When the electric signal from the CCD 101 is inputted to the AGC circuit 102, in a case where the level of the input signal is not less than a predetermined level, the signal is not amplified and is outputted with the factor of amplification being 1. In a case where the level of the input signal is not more than the predetermined level, the signal is amplified with an increased factor of amplification so that the signal is of the predetermined level.

Then, the output signal of the AGC circuit 102 is converted into a digital video signal by the A/D converter 103.

The video signal converted into a digital signal by the A/D converter 103 is inputted to the subtracter 104, undergoes the subtraction with the output signal of the field memory 107, and is outputted as a difference signal. Since the output signal of the field memory 107 is a signal which is an already-noise-reduced output video signal SO delayed by one field, when the video signal is representative of an object of image formation that is stationary, the video signals of the fields are substantially the same. Therefore, hardly any video signals are included in the difference signal, and only noise components are extracted.

Therefore, by subtracting the output signal of the subtracter 104 from the output signal of the A/D converter 103 by the subtracter 106, a noise-reduced new output video signal SO is outputted. The new output video signal SO is inputted to the field memory 107 as the reference signal, and is used for the noise reduction of the video signal of the next field.

In a moving image where the object of image formation is moving, since the video signals of the fields are different from one another, a large number of video signals are included in the difference signal. Therefore, if the difference signal is subtracted as it is, although noise is reduced in the output video signal SO, the image signal of the immediately preceding field is added at the same time, so that after-image degradation is caused in the image plane.

This defect is handled as follows: Based on a statistical reason that variations with time of the amplitude of noise are generally smaller than those of video signals, regarding a part of the difference signal with a large amplitude as a video signal and a part thereof with a small amplitude as noise, only the part with the small amplitude is extracted by the nonlinear processing circuit 105. With a signal that is the extracted part with the small amplitude as the difference signal, the difference signal is subtracted from the A/D converted video signal by the subtracter 106, whereby a video signal SO where noise has been reduced without any after-image can be outputted.

FIG. 10 is a view showing an example of the characteristic of the nonlinear processing circuit 105. The horizontal axis represents the input of the nonlinear processing circuit 105, and the vertical axis represents the output thereof. "a" and "K" are characteristic parameters characterizing this characteristic.

When the absolute value of the input level of the nonlinear processing circuit that is the level of the output of the subtracter 104 is not more than a, regarding the output of the subtracter 104 as being substantially all a noise signal, a signal having a magnitude of K·x (K<1, x is the input of the nonlinear processing circuit and |x|≦a) and whose level is reduced by a multiplication by the characteristic parameter K is outputted as the difference signal.

When the absolute value of the input signal level of the nonlinear processing circuit is not less than "a" and less than "2a", the output of the subtracter 104 includes both noise and video signals. Therefore, regarding the ratio of the video signals as increasing as the level increases, the output is reduced with K as the proportionality constant as the absolute value of the input signal level approaches from a to 2a, and a signal of the absolute value of a level close to zero is outputted as the difference signal. When the absolute value of the input level of the nonlinear processing circuit is not less than 2a, regarding the output of the subtracter 104 as being all a video signal, the output to the subtracter 106 is not made.

According to this nonlinear processing characteristic, a signal where the absolute value of the signal level of the input of the nonlinear processing circuit, that is, the output of the subtracter 104 is not more than 2a is regarded as including noise, and a signal reduced by the nonlinear processing in accordance with the signal level is outputted to the subtracter 106 as the difference signal, so that noise can be reduced while after-image degradation is suppressed. The entire disclosure of the above-described Japanese Laid-Open Patent Application No. H03-79168 are incorporated herein by citation (reference) in its entirety.

When the quantity of the light incident on the CCD 101 decreases to reduce the level of the output video signal from the CCD 101, since the noise level is constant irrespective of the output signal level, the S/N ratio deteriorates. When the level is further reduced to a level lower than a predetermined level, the AGC circuit 102 amplifies the input signal so that the predetermined level is maintained. However, since both the signal and noise are amplified with the same factor of amplification with the S/N ratio being degraded, the noise level increases.

On the other hand, the nonlinear processing control circuit 108 changes the characteristic of the nonlinear processing circuit in accordance with the factor of amplification of the AGC circuit 102. Specifically, by setting the value of the characteristic parameter "a" to a high value, the level of the signal regarded as noise is increased. By doing this, even when the noise included in the video signal is increased by the amplification by the AGC circuit 102, it can be reduced.

However, in the output of the subtracter 105, it is impossible to distinguish by the magnitude of the amplitude between the video signal intrinsically having a predetermined amplitude and the noise whose level is increased by the amplification. Therefore, when the value of the characteristic parameter "a" is set to a high value in accordance with the amplified noise level, the video signal which is intrinsically necessary is reduced together with noise by the nonlinear processing circuit 105. Consequently, the output of the nonlinear processing circuit 105 includes a large number of video signals in the field memory 107, so that the after-image degradation in the output video signal SO increases.

That is, when it is necessary to amplify the video signal by the AGC amplifier circuit 102 because the level of the output video signal from the CCD 101 is reduced, since noise is largely amplified compared to the video signal, it is difficult to perform noise removal with consideration of after-image degradation by the nonlinear processing circuit 105 that distinguishes between noise and the video signal based on a statistical reason that variations with time of the amplitude of noise are smaller than those of video signals.

DISCLOSURE OF INVENTION

The present invention solves the above-mentioned conventional problem, and an object thereof is to provide a noise reducing device, a noise reducing method and the like with which noise is efficiently reduced and the generation of after-image degradation is small even when the S/N ratio of the video signal is degraded and it is necessary to amplify the video signal.

A first aspect of the invention relates to a noise reducing device comprising:

amplifying means of amplifying a video signal;

video signal level reducing means of splitting the video signal amplified by the amplifying means into a plurality of bands in accordance with a spatial frequency thereof, reducing a level of a higher frequency component of the video signal based on a comparison between a first characteristic parameter based on a factor of amplification of the amplifying means and the level of the higher frequency component, and synthesizing the reduced higher frequency component and a component of another band with each other;

difference signal extracting means of extracting a difference signal between an output of the video signal reducing means and a predetermined reference signal;

difference signal level reducing means of reducing a level of the difference signal based on a comparison between the level of the difference signal and a predetermined second characteristic parameter; and subtracting means of subtracting an output of the difference signal level reducing means from the video signal, wherein an output of the subtracting means is outputted as the video signal whose noise has been reduced, and is used as a new reference signal.

Moreover, a second aspect of the invention relates to a noise reducing device comprising:

amplifying means of amplifying a video signal;

difference signal extracting means of extracting a difference signal between an output of the amplifying means and a predetermined reference signal;

difference signal level reducing means of reducing a level of the difference signal; and subtracting means of subtracting an output of the difference signal level reducing means from the video signal, wherein an output of the subtracting means is outputted as the video signal whose noise has been reduced, and is used as a new reference signal, and wherein the difference signal level reducing means splits the difference signal into a plurality of bands in accordance with the spatial frequency thereof, reduces for each of the bands a level of a higher frequency signal of the plurality of difference signals based on a comparison between a level of the difference signal and a predetermined third characteristic parameter determined for each of the bands, and combines the split bands together to obtain the output.

Moreover, a third aspect of the invention relates to the noise reducing device according the first aspect of the invention, wherein the first characteristic parameter of the video signal level reducing means varies in accordance with the factor of amplification of the amplifying means.

Moreover, a fourth aspect of the invention relates to the noise reducing device according to any one of the first to the third aspects of the invention, wherein the second or the third characteristic parameters of the difference signal level reducing means varies in accordance with the factor of amplification of the amplifying means.

Moreover, a fifth aspect of the invention relates to the noise reducing device according to the fourth aspect of the invention, wherein when the factor of amplification of the amplifying means is not more than a predetermined value, the second characteristic parameter of the difference signal level reducing means is maintained fixed, and the first characteristic parameter of the video signal level reducing means is increased, and wherein when the factor of amplification is higher than the predetermined value, the first characteristic parameter of the video signal level reducing means is maintained fixed, and the second characteristic parameter of the difference signal level reducing means is increased.

Moreover, a sixth aspect of the invention relates to the noise reducing device according to the fourth aspect of the invention, wherein when the factor of amplification of the amplifying means is not more than a predetermined value, the first characteristic parameter of the video signal level reducing means is maintained fixed, and the second characteristic parameter of the difference signal level reducing means is increased, and wherein when the factor of amplification is higher than the predetermined value, the second characteristic parameter of the difference signal level reducing means is maintained fixed, and the first characteristic parameter of the video signal level reducing means is increased.

Moreover, a seventh aspect of the invention relates to the noise reducing device according to the first aspect of the invention, wherein the video signal level reducing means comprises:

a plurality of filters including a low pass filter and a high pass filter and frequency-dividing the video signal;

a coring circuit receiving an output from the high pass filter, cutting the output when a level of the output is not more than the first characteristic parameter, and reducing the level when the level is higher than the first parameter; and synthesizing means of synthesizing an output of the low pass filter and an output of the coring circuit with each other.

Moreover, an eighth aspect of the invention relates to the noise reducing device according to the first aspect of the invention, wherein the video signal level reducing means comprises:

a plurality of band pass filters frequency-dividing the video signal;

a coring circuit receiving an output of, of the plurality of band pass filters, a band pass filter whose pass band is a high frequency region, cutting the output when a level of the output is not more than the first characteristic parameter, and reducing the level when the level is higher than the first parameter; and synthesizing means of synthesizing an output of, of the plurality of band pass filters, a band pass filter whose pass band is a low frequency region and an output of the coring circuit with each other.

Moreover, a ninth aspect of the invention relates to the noise reducing device according to the second aspect of the invention wherein the difference signal level reducing means comprises:

a plurality of filters frequency-dividing the video signal;

a plurality of level reducing means reducing a level of an output of each of the plurality of filters based on a comparison with the third characteristic parameter of each of the level reducing means; and synthesizing means synthesizing an output of the plurality of level reducing means, wherein values of the third characteristic parameters of the plurality of level reducing means are higher as pass bands of the plurality of filters to which the corresponding ones of the plurality of level reducing means are connected are higher.

Moreover, a tenth aspect of the invention relates to the noise reducing device according to the ninth aspect of the invention wherein the plurality of filters are band pass filters having different pass bands.

Moreover, an eleventh aspect of the invention relates to the noise reducing device of the ninth aspect of the invention wherein the plurality of filters include a low pass filter and a high pass filter.

Moreover, a twelfth aspect of the invention relates to the noise reducing device according to the first or the second aspects of the invention, wherein the video signal is inputted every n-th field or n-th horizontal period (n is a natural number), and the difference signal corresponding to an m-th video signal that is inputted is obtained by using as the predetermined reference signal a signal obtained at least based on an (m−1)-th video signal that is inputted.

Moreover, a thirteenth aspect of the invention relates to an image forming apparatus comprising:

the noise reducing device according to any one of the first to the twelfth aspects of the invention; and image forming means of imaging an object and obtaining a video signal.

Moreover, a fourteenth eleventh aspect of the invention relates to a noise reducing method comprising:

an amplifying step of amplifying a video signal;

a video signal level reducing step of splitting the video signal amplified by the amplifying step into a plurality of bands in accordance with a spatial frequency thereof, reducing a level of a higher frequency component of the video signal based on a comparison between a first characteristic parameter based on an factor of amplification of the amplifying step and the level of the higher frequency component, and synthesizing the reduced higher frequency component and a component of another band with each other;

a difference signal extracting step of extracting a difference signal between an output of the video signal reducing step and a predetermined reference signal;

a difference signal level reducing step of reducing a level of the difference signal based on a comparison between the level of the difference signal and a predetermined second characteristic parameter; and a subtracting step of subtracting an output of the difference signal level reducing step from the video signal, wherein an output of the subtracting step is outputted as the video signal whose noise has been reduced, and is used as a new reference signal.

Moreover, a fifteenth aspect of the invention relates to a noise reducing method comprising:

an amplifying step of amplifying a video signal;

a difference signal extracting step of extracting a difference signal between an output of the amplifying step and a predetermined reference signal;

a difference signal level reducing step of reducing a level of the difference signal; and a subtracting step of subtracting an output of the difference signal level reducing step from the video signal, wherein an output of the subtracting step is outputted as the video signal whose noise has been reduced, and is used as a new reference signal, and wherein in the difference signal level reducing step, the difference signal is split into a plurality of bands in accordance with the spatial frequency thereof, a level of a higher frequency signal of the plurality of difference signals is reduced for each of the bands based on a comparison between a level of the difference signal and a predetermined third characteristic parameter determined for each of the bands, and the split bands are combined together to obtain the output.

Moreover, a sixteenth aspect of the invention relates to a program for causing a computer to function as the following means of the noise reducing device according to the first aspect of the invention: the amplifying means of amplifying the video signal; the video signal level reducing means of splitting the video signal amplified by the amplifying means into a plurality of bands in accordance with the spatial frequency thereof, reducing the level of the higher frequency component of the video signal based on the comparison between the first characteristic parameter based on the factor of amplification of the amplifying means and the level of the higher frequency component, and synthesizing the reduced higher frequency component and the component of another band with each other; the difference signal extracting means of extracting the difference signal between the output of the video signal reducing means and the predetermined reference signal; the difference signal level reducing means of reducing the level of the difference signal based on the comparison between the level of the difference signal and the predetermined second characteristic parameter; and the subtracting means of subtracting the output of the difference signal reducing means from the video signal.

Moreover, a seventeenth aspect of the invention relates to a program of causing a computer to function as the following means of the noise reducing device of the first aspect of the invention: amplifying means of amplifying a video signal; difference signal extracting means of extracting a difference signal between an output of the amplifying means and a predetermined reference signal; difference signal level reducing means of reducing a level of the difference signal; and subtracting means of subtracting an output of the difference signal level reducing means from the video signal.

Moreover, an eighteenth aspect of the invention relates to a computer-processable recording medium holding the program according to the sixteenth or the seventeenth aspects of the invention.

EXPLANATION OF REFERENCE NUMERALS

Figure 1:
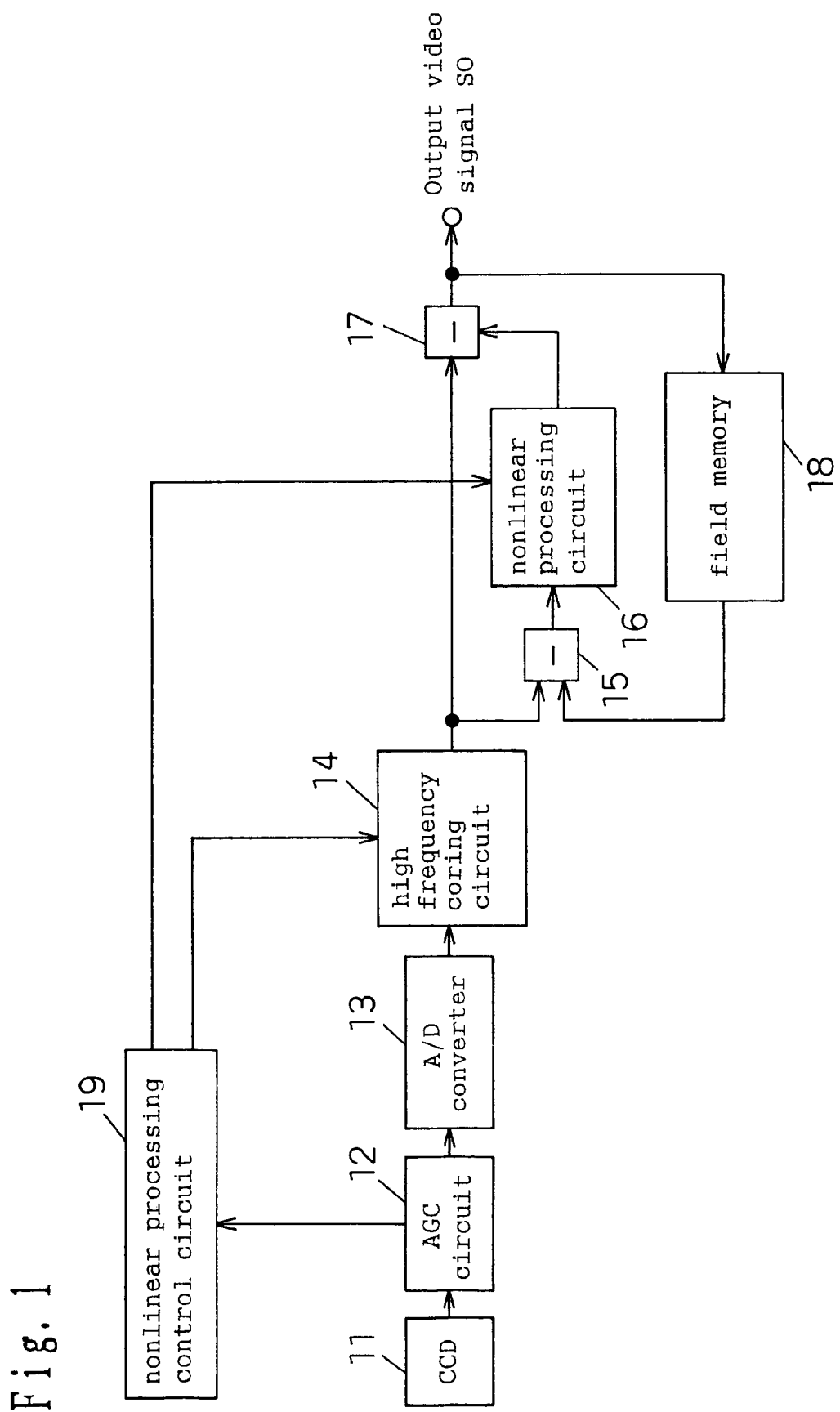
FIG. 1 is a block diagram showing the structure of a noise reducing device according to a first embodiment of the present invention.

11 CCD
12 AGC circuit
13 A/D converter
14 high frequency coring circuit
15 subtracter
16 nonlinear processing circuit
17 subtracter
18 field memory
19 nonlinear processing control circuit
21 HPF
22 LPF
23 coring circuit
24 adder
61 BPF
62 nonlinear processing circuit
63 adder

BEST MODE FOR CARRYING OUT THE INVENTION

Hereinafter, embodiments of the present invention will be described with reference to the drawings.

First Embodiment

FIG. 1 is a block diagram illustrating the basic structure of a relevant part of an image forming apparatus having a noise reducing device according to a first embodiment of the present invention. In FIG. 1, reference numeral 11 represents a CCD, corresponding to the image forming means of the present invention, converting incident light into an electric video signal. Reference numeral 12 represents an AGC circuit performing amplification so that the output signal level is maintained constant even when the output signal from the CCD 11 is changed. Reference numeral 13 represents an A/D converter converting the output analog video signal from the AGC circuit 12 into a digital video signal. Reference numeral 14 represents a high frequency coring circuit performing nonlinear processing only on a high frequency signal of the output of the A/D converter. Reference numeral 18 represents a field memory delaying an output video signal SO of this device by one field and outputting the signal as the reference signal of the present invention. Reference numeral 15 represents a subtracter obtaining the difference between the output signal of the high frequency coring circuit 14 and the output signal of the field memory 18 and outputting the difference. Reference numeral 16 represents a nonlinear processing circuit performing nonlinear processing on the output of the subtracter 15 by use of a characteristic parameter "a" corresponding to the second characteristic parameter of the present invention and a characteristic parameter "K". Reference numeral 17 represents a subtracter subtracting the output of the nonlinear processing circuit 16 from the output signal of the high frequency coring circuit 14 and outputting the video signal SO. In this structure, the AGC circuit 12 corresponds to the amplifying means of the present invention, the high frequency coring circuit 14 corresponds to the video signal level reducing means of the present invention, the subtracter 15 corresponds to the difference signal extracting means of the present invention, the nonlinear processing circuit 16 corresponds to the difference signal level reducing means of the present invention, and the subtracter 17 corresponds to the subtracting means of the present invention.

The operation of the noise reducing device of the first embodiment of the present invention having the above-described structure will be described, and with this, an embodiment of the noise reducing method of the present invention will also be described.

Figure 9:
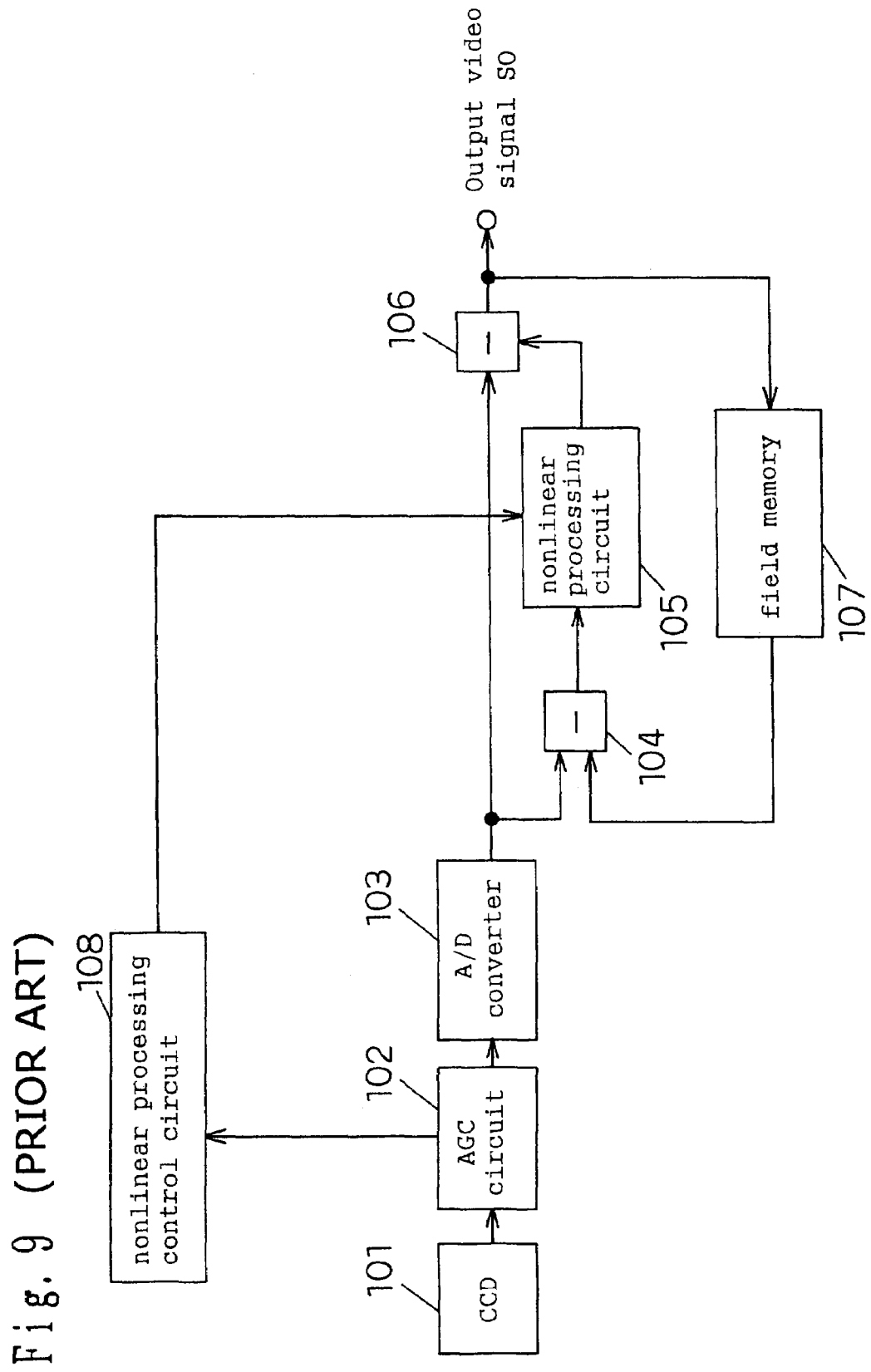
FIG. 9 is a block diagram showing the structure of the conventional noise reducing device.

The operation from the CCD 11 to the A/D converter 13 will not be described since it is the same as the operation from the CCD 101 to the A/D converter 103 of the conventional noise reducing device shown in FIG. 9.

Then, the video signal converted into a digital signal by the A/D converter 13 is inputted to the high frequency coring circuit 14.

Figure 2:
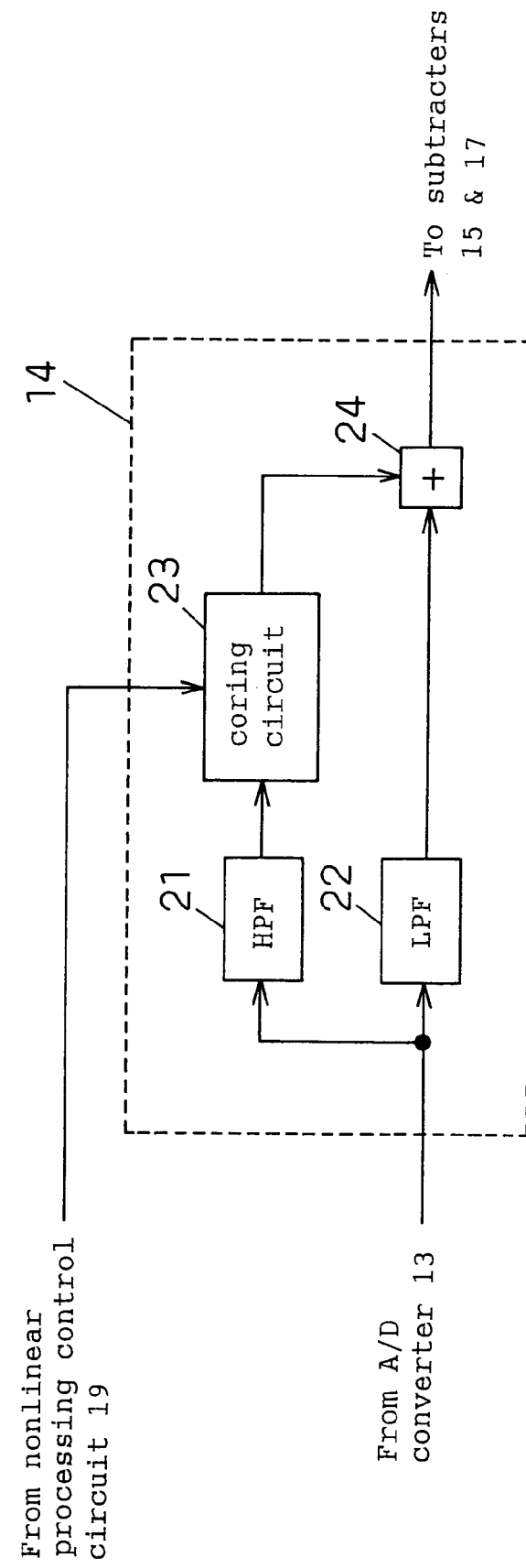
FIG. 2 is a block diagram showing an example of the structure of a high frequency coring circuit used in the first and second embodiments of the present invention.
Figure 3:
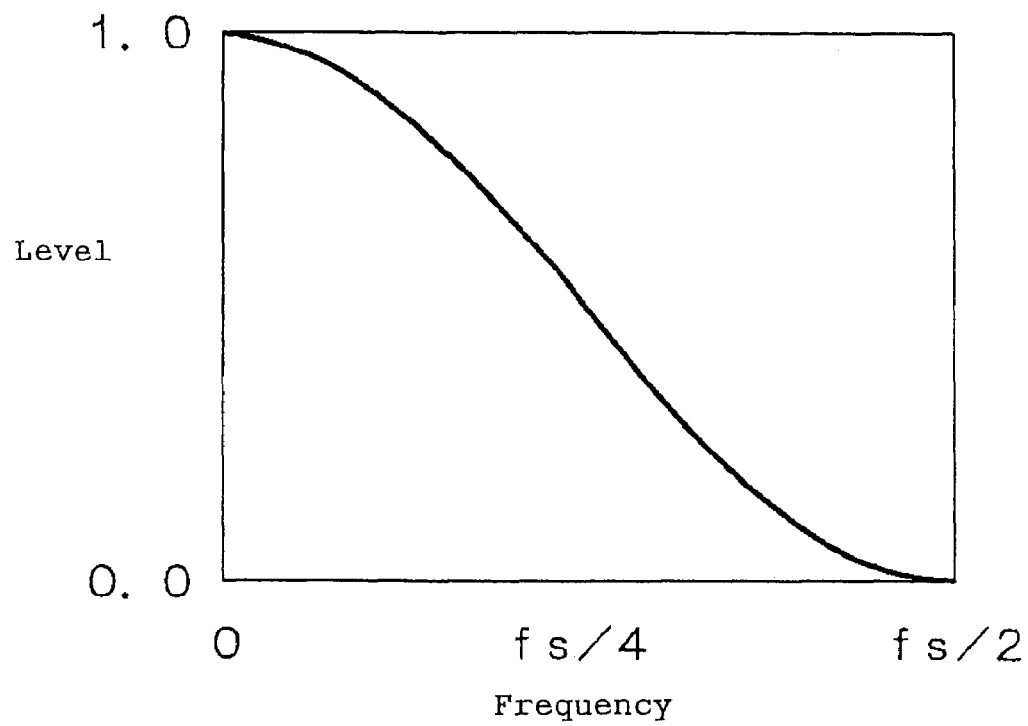
FIG. 3(a) is a frequency characteristic view showing the frequency characteristic of a LPF used in the first and second embodiments of the present invention.
FIG. 3(b) is a frequency characteristic view showing the frequency characteristic of a HPF used in the first and second embodiments of the present invention.
Figure 3:
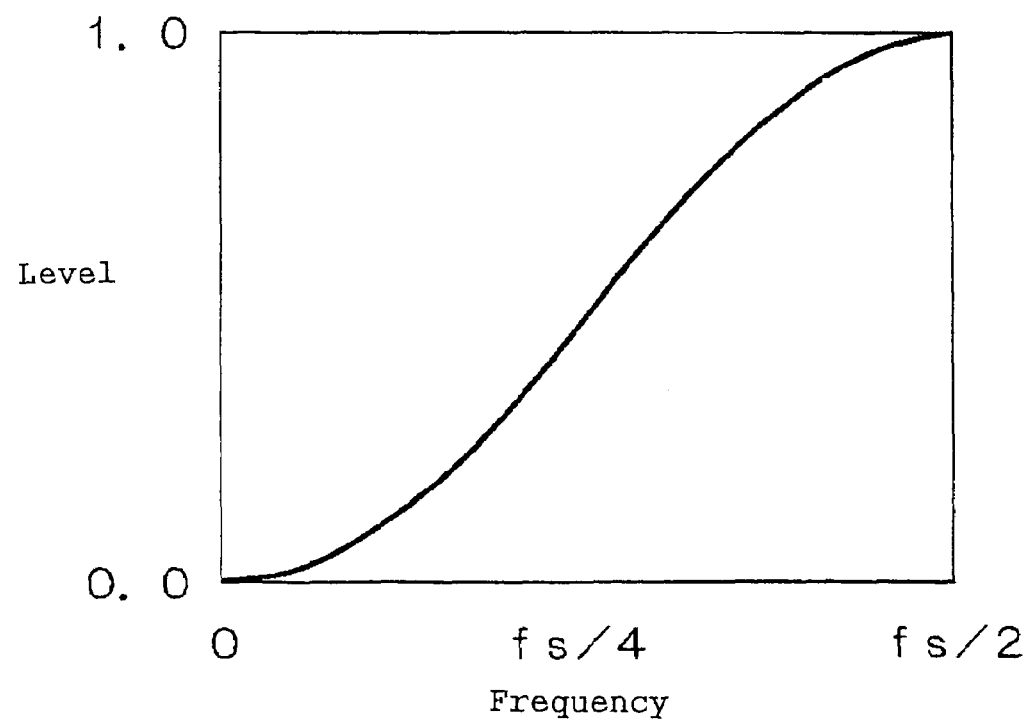

FIG. 2 is a block diagram showing an example of the high frequency coring circuit 14. When inputted to the high frequency coring circuit 14, the output video signal of the A/D converter 13 is first band-split into a high frequency region and a low frequency region by an HPF (high pass filter) 21 and an LPF (low pass filter) 22. These filters have frequency characteristics, for example, as shown in FIG. 3. FIG. 3(a) shows the frequency characteristic of the LPF, and FIG. 3(b) shows the frequency characteristic of the HPF.

Of the video signal split into the high frequency component and the low frequency component by these filters, the signal of the high frequency component having passed through the HPF 21 is inputted to a coring circuit 23 performing nonlinear processing.

Figure 4:
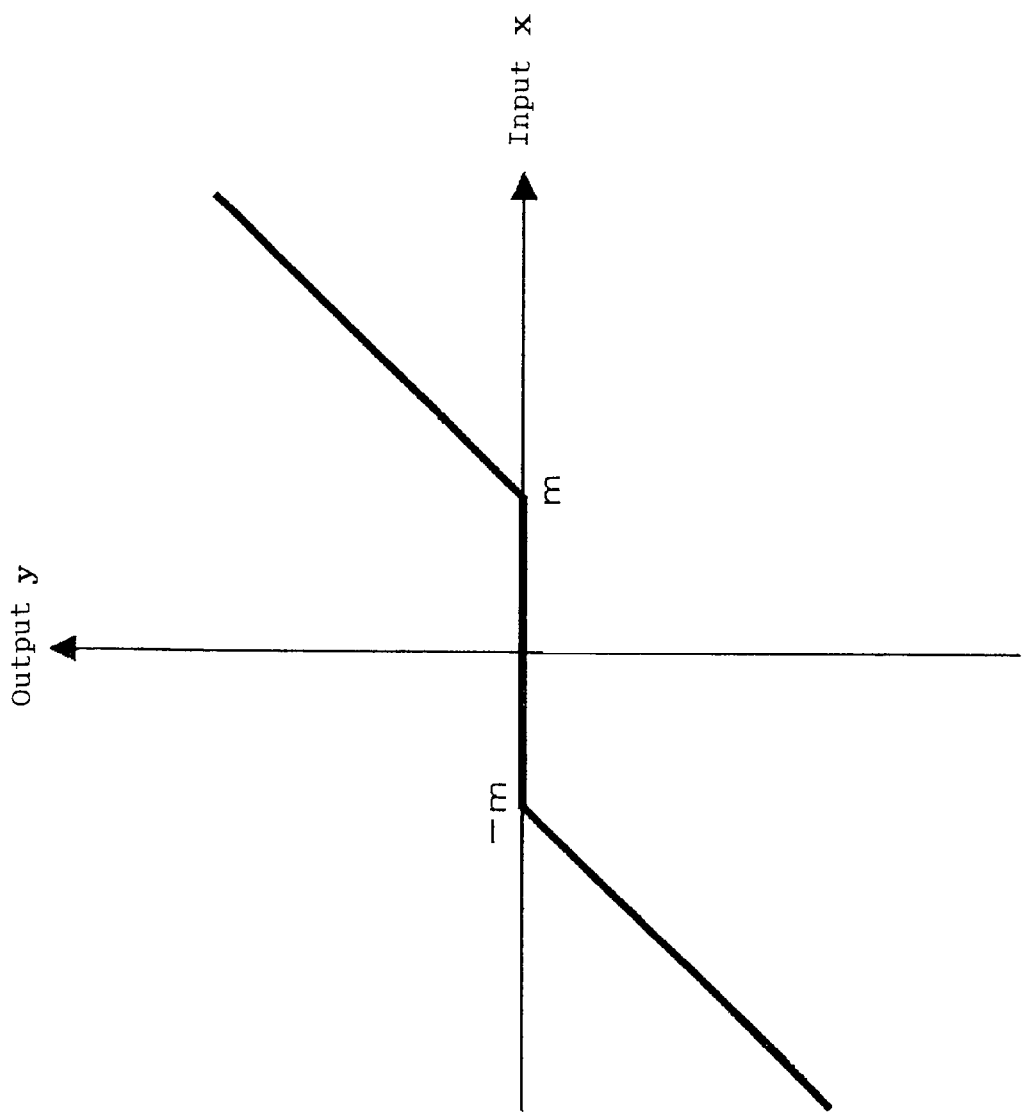
FIG. 4 is an input/output characteristic view showing an example of the input/output characteristic of the coring circuit used in the first and second embodiments of the present invention.

FIG. 4 shows an example of the input/output characteristic of the coring circuit 23, and m is a characteristic parameter, corresponding to the first characteristic parameter of the present invention, characterizing this characteristic. The signals inputted to the coring circuit 23 by this input/output characteristic have the amplitudes thereof compared with this characteristic parameter, and as a consequence, only the ones whose amplitudes are larger than a predetermined amplitude are outputted after reduced in accordance with the value of the characteristic parameter. That is, when the level of the input signal of the coring circuit 23 is x, a signal where $|x| \leq m$ is not outputted, and a signal where $|x| > m$ is outputted with the absolute value of the signal level being reduced to a value lower by m.

The high frequency signal component having passed through the coring circuit 23 and the low frequency signal component that is the output of the LPF 22 are added together by an adder 24 to thereby restore the entire band of the video signal, and the video signal with the restored band is outputted to the succeeding subtracters 15 and 17 as the output of the high frequency coring circuit 14.

Noise has not only a characteristic as mentioned above that variations with time of its amplitude are generally smaller than those of video signals but also a characteristic that noise is more largely distributed in a high frequency region than in a low frequency region in the spatial frequency. In a case where the video signal includes a certain degree of noise by the high frequency coring circuit 14, specifically, the output signal of the A/D converter 13 includes noise of a level Sn in the absolute value, when $Sn \leq m$, the noise level is reduced to zero, and when $Sn > m$, it is reduced to $Sn-m$. Further, in the noise reduction by the high frequency coring circuit 14, no after-image is generated in principle.

The operations of the subtracter 15, the subtracter 17, the nonlinear processing circuit 16 and the field memory 18 succeeding the high frequency coring circuit 14 are similar to those of the subtracter 104, the subtracter 106, the nonlinear processing circuit 105 and the field memory 107 of the conventional noise reducing device. Therefore, the nonlinear processing circuit 16 processes the output of the subtracter 104 in accordance with the characteristic shown in FIG. 10, the output of the high frequency coring circuit 14 is further noise-reduced and outputted as the output video signal SO, and the output video signal SO is stored in the field memory 18 in order to be outputted to the subtracter 15 as the reference signal of the present invention in the noise reduction processing of the video signal of the next field.

Figure 10:
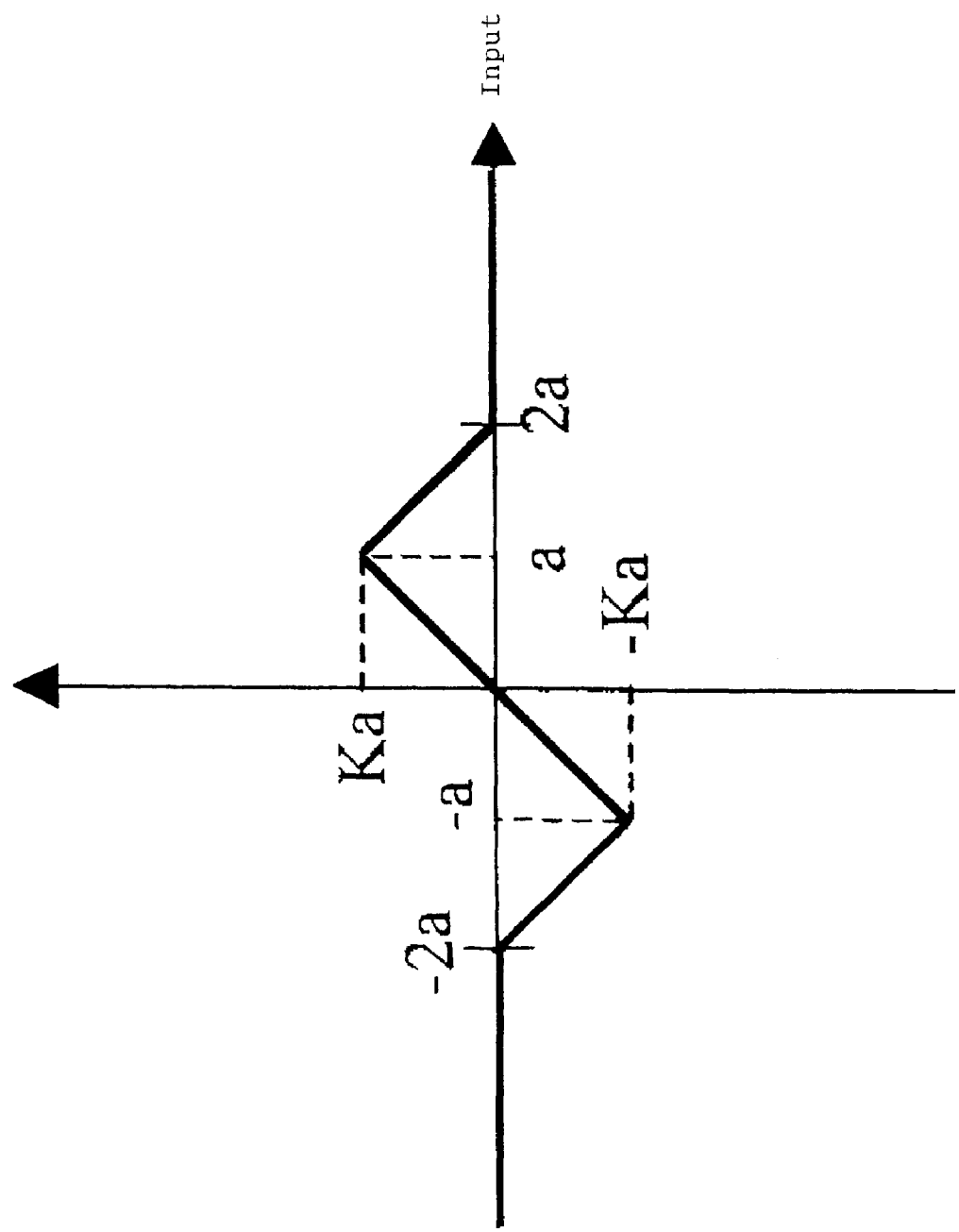
FIG. 10 is an input/output characteristic view showing the input/output characteristic of the nonlinear processing circuit in the conventional noise reducing device.

Specifically, of the noises whose absolute value levels are reduced to Sn−m by the high frequency coring circuit 14, noises whose absolute value levels are not more than 2a are further reduced to K·a at the maximum in accordance with the characteristic shown in FIG. 10.

The nonlinear processing control circuit 19 performs control as shown in FIG. 5 on the characteristic parameter m of the coring circuit 23 in the high frequency coring circuit 14 and the characteristic parameter a of the nonlinear processing circuit 16 in accordance with the factor of amplification of the AGC circuit 12. That is, when the quantity of the light incident on the CCD 11 decreases to reduce the level of the output video signal from the CCD 11 as shown in FIG. 5 (a), the AGC circuit 12 increases the factor of amplification so that a predetermined level is maintained like in the conventional example, and when the factor of amplification is not more than a predetermined value G1 as shown in FIG. 5(b) first, the characteristic parameter m of the coring circuit 23 is increased. On the other hand, the characteristic parameter a of the nonlinear processing circuit 16 is maintained fixed. In FIG. 5(c), since a=0 is maintained as an example, the signal substantially does not pass through the nonlinear processing circuit 16 at all. The characteristic parameter a may be maintained fixed at a given value.

Figure 5A:
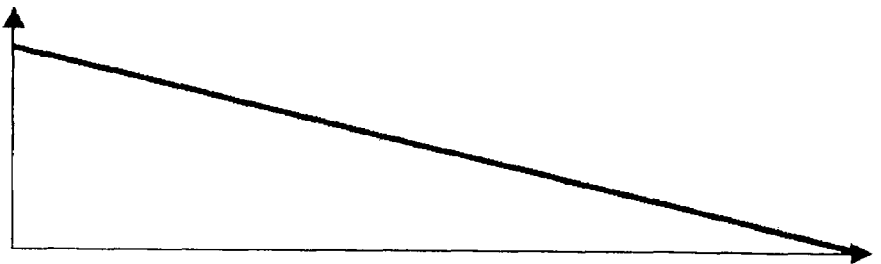
FIG. 5(a) is a view showing the relationship between the level of the CCD output signal and the quantity of the incident light in the first embodiment of the present invention.
Figure 5B:
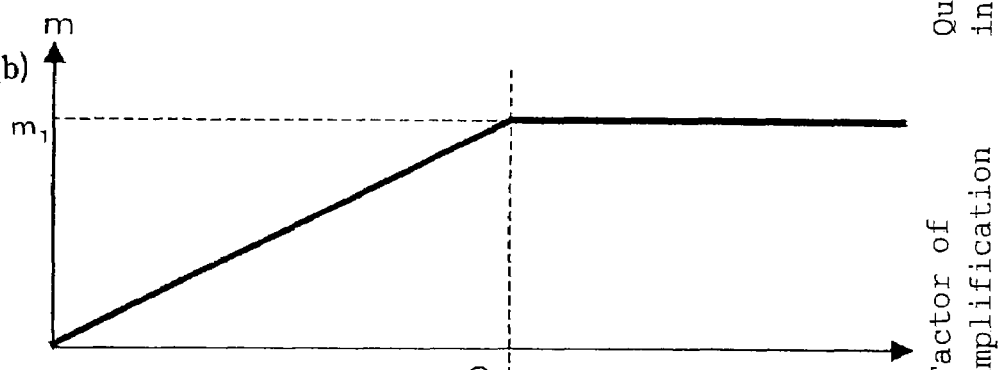
FIG. 5(b) is a relational view showing an example of the relationship between the value of the characteristic parameter of a coring circuit and the factor of amplification of an AGC circuit in the first embodiment of the present invention.
Figure 5C:
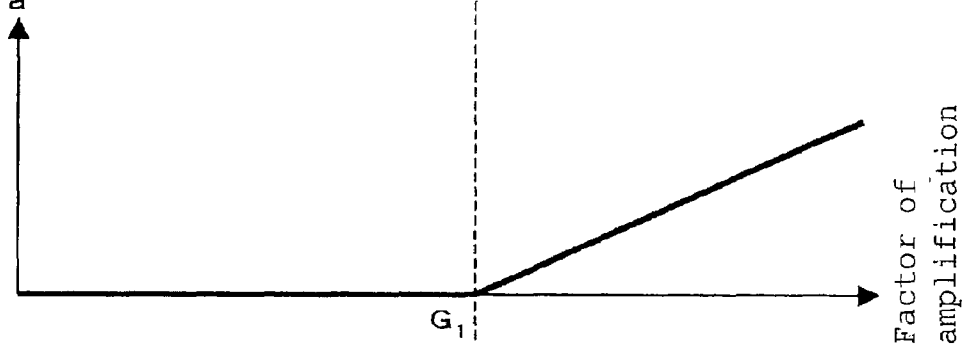
FIG. 5(c) is a relational view showing an example of the relationship between the value of the characteristic parameter of a nonlinear processing circuit and the factor of amplification of the AGC circuit in the first embodiment of the present invention.
Figure 5D:
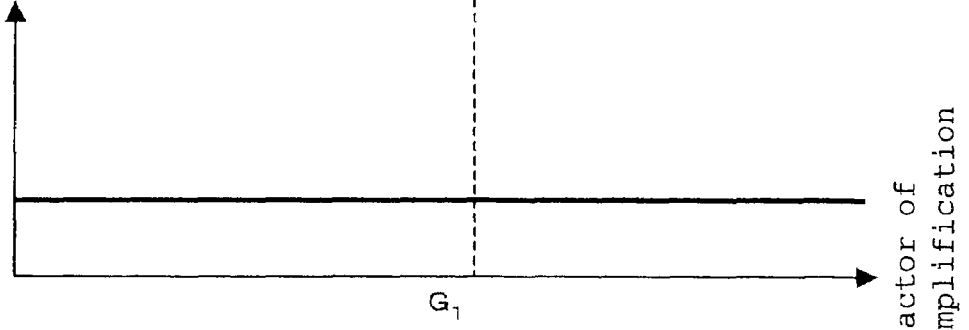
FIG. 5(d) is a relational view showing another example of the relationship between the value of the characteristic parameter of a nonlinear processing circuit and the factor of amplification of the AGC circuit in the first embodiment of the present invention.

The high frequency coring circuit 14 reduces the noise distributed in a high frequency region of the signal. However, since the high-frequency video signal such as detail is similarly reduced, detail degradation becomes conspicuous if m is increased too much. Therefore, after the factor of amplification of the AGC circuit 12 reaches G1, even if the factor of amplification further increases, the characteristic parameter m is fixed to a value m1 where detail degradation is permissible, and instead, the characteristic parameter a of the nonlinear processing circuit 16 is increased as shown in FIG. 5(c).

By this operation, even if the factor of amplification of the AGC circuit 12 increases to increase the noise level Sn of the output signal of the A/D converter 13, when the factor of amplification is not more than G1, noise reduction is performed by the high frequency coring circuit 14, and noise reduction by the succeeding operation is not performed. Consequently, in that case, no after-image degradation is caused even when the video signal includes various motion components, for example, motion components of low spatial frequencies such as motions of the subject itself and motions of the entire image plane by panning of the image forming apparatus itself, and motion components of high spatial frequencies such as camera shake.

Moreover, when the factor of amplification is not less than G1, after-image degradation can also be reduced more than in the conventional example because the value of the characteristic parameter "a" can be suppressed to a value lower than that of the conventional example since noise is reduced by a certain level by the high frequency coring circuit 14.

Moreover, the nonlinear processing control circuit 19 performs the control of the characteristic parameter "m" and the characteristic parameter "a" in the following manner: When the quantity of the light incident on the CCD 11 decreases to reduce the level of the output video signal from the CCD 11 as shown in FIG. 11(a), the AGC circuit 12 increases the factor of amplification so that a predetermined level is maintained like in the conventional example, and when the factor of amplification is not more than a predetermined value G2 as shown in FIG. 11(b), first, the characteristic parameter "a" of the nonlinear processing circuit 16 is increased. On the other hand, the characteristic parameter "m" of the coring circuit 23 is maintained fixed. In FIG. 11(c), since m=0 is maintained as an example, the signal substantially passes through the coring circuit 14. The characteristic parameter "m" may be maintained fixed at a given value.

The nonlinear processing circuit 16 reduces the noise distributed in a high frequency region of the spatial frequency of the signal. However, after-image degradation is caused in the image if the parameter "a" is excessively increased as described in the background art. Therefore, after the factor of amplification of the AGC circuit 12 reaches G2, even if the factor of amplification further increases, the characteristic parameter "a" is fixed to a value a4 where after-image degradation is permissible, and instead, the characteristic parameter "m" of the coring circuit 23 is increased as shown in FIG. 11(c).

In the case of this operation, even if the factor of amplification of the AGC circuit 12 increases to increase the noise level Sn of the output signal of the A/D converter 13, when the factor of amplification is not more than G2, noise reduction is performed by the nonlinear processing circuit 16, and noise reduction other than that is not performed. Consequently, in that case, noise can be reduced only with after-image degradation in a permissible range.

Further, when the factor of amplification is not less than G2, since three-dimensional noise reduction is performed after noise is reduced up to a point by also using the high frequency coring circuit 14, it is unnecessary to set the value of the characteristic parameter "a" of the nonlinear processing circuit 16 to a4 that is lower than that in the conventional example, so that after-image degradation can be reduced more than in the conventional example.

Second Embodiment

Figure 6:
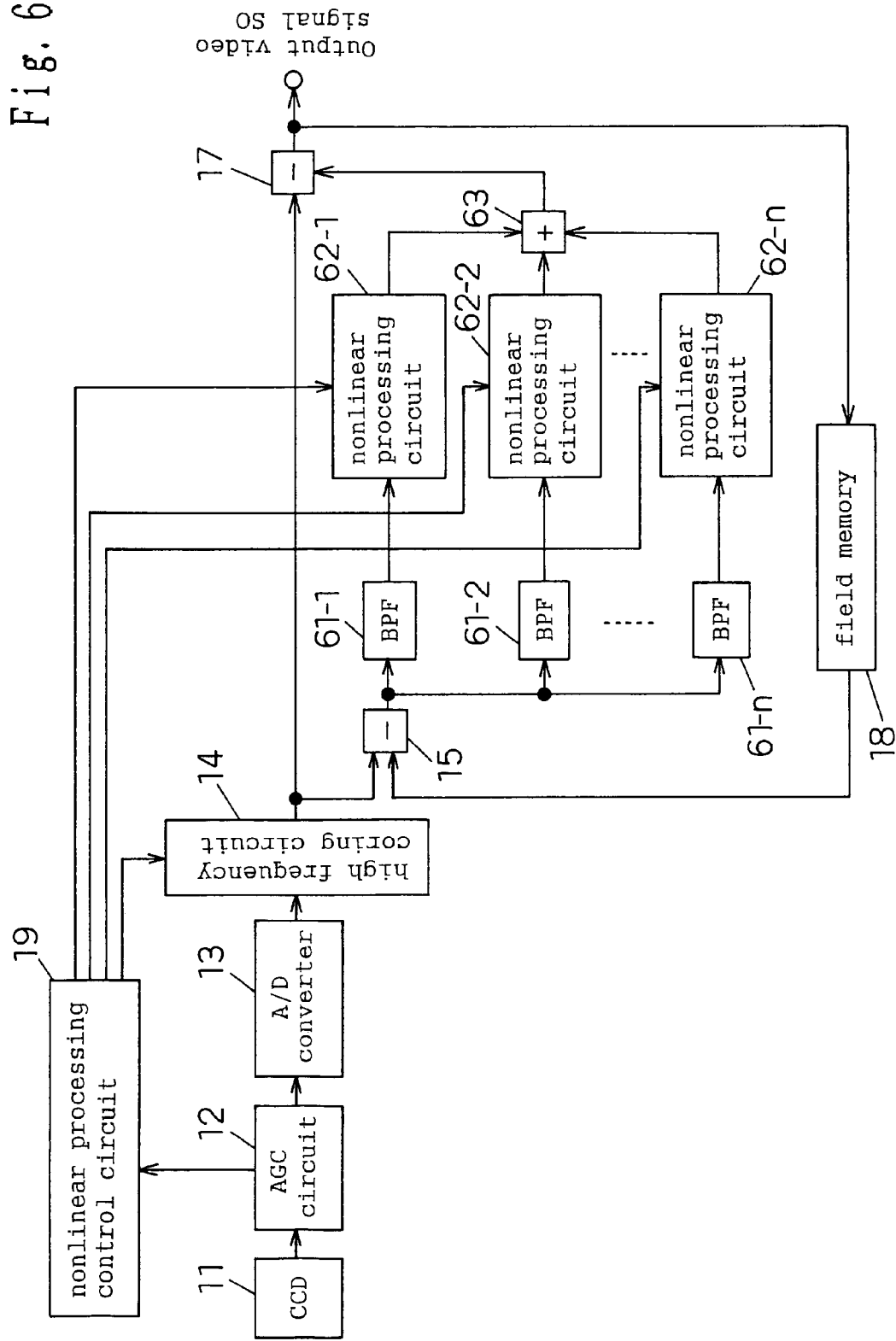
FIG. 6 is a block diagram showing the structure of a noise reducing device according to the second embodiment of the present invention.

FIG. 6 is a block diagram illustrating the basic structure of a relevant part of an image forming apparatus having a noise reducing device according to a second embodiment of the present invention. In FIG. 6, since the same reference numerals are used for function blocks the same as or corresponding to those of the first embodiment of FIG. 1, no description of the blocks will be given. In FIG. 6, reference numerals 61-1 to 61-n represent BPFs (band pass filters) splitting the output of the subtracter 15 into a plurality of bands, reference numerals 62-1 to 62-n represent a plurality of nonlinear processing circuits performing nonlinear processing on the outputs of the BPFs 61-1 to 61-n, respectively, and reference numeral 63 represents an adder adding all of the outputs from the nonlinear processing circuits 62-1 to 62-n together and outputting the sum to the subtracter 17.

The nonlinear processing circuits 62-1 to 62-n are assigned different characteristic parameters, respectively, and the values of these parameters are increased by the nonlinear processing control circuit 108 in accordance with the factor of amplification of the AGC circuit 102 like in the conventional example and the first embodiment.

In this structure, the BPFs 61-1 to 61-n, the nonlinear processing circuits 62-1 to 62-n and the adder 63 constitute the difference signal level reducing means of the present invention, the BPFs 61-1 to 61-n correspond to the plurality of filters of the present invention, the nonlinear processing circuits 62-1 to 62-n correspond to the level reducing means of the present invention, and the adder 63 corresponds to the synthsizing means of the present invention.

The operation of the noise reducing device of the second embodiment of the present invention having the above-described structure will be described, and with this, an embodiment of the noise reducing method of the present invention will also be described. Since the noise reducing device of the present embodiment is different from the noise reducing device of the first embodiment in the BPFs 61-1 to 61-n, the nonlinear processing circuits 62-1 to 62-n and the adder 63, description will be given in the following with emphasis on this operation.

The output signal of the subtracter 15 is split into a plurality of bands in the spatial frequency by the BPFs 61-1 to 61-n, and nonlinear processing similar to that of the first embodiment is individually performed thereon by the nonlinear processing circuits 62-1 to 62-n. Then, the outputs of the nonlinear processing circuits are synthesized into one by the adder 63.

Figure 12:
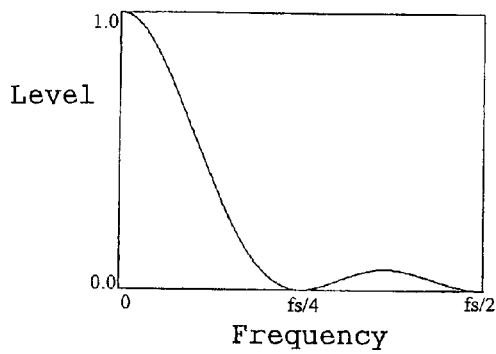
FIG. 12(a) is a frequency characteristic view showing the frequency characteristic of a BPF in the noise reducing device of the second embodiment of the present invention.
FIG. 12(b) is an input/output characteristic view showing the input/output characteristic of a nonlinear processing circuit in the noise reducing device of the second embodiment of the present invention.
FIG. 12(c) is a frequency characteristic view showing the frequency characteristic of the BPF in the noise reducing device of the second embodiment of the present invention.
FIG. 12(d) is an input/output characteristic view showing the input/output characteristic of the nonlinear processing circuit in the noise reducing device of the second embodiment of the present invention.
FIG. 12(e) is a frequency characteristic view showing the frequency characteristic of the BPF in the noise reducing device of the second embodiment of the present invention.
FIG. 12(f) is an input/output characteristic view showing the input/output characteristic of the nonlinear processing circuit in the noise reducing device of the second embodiment of the present invention.
Figure 12:
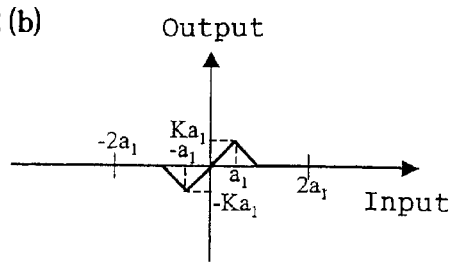
Figure 12:
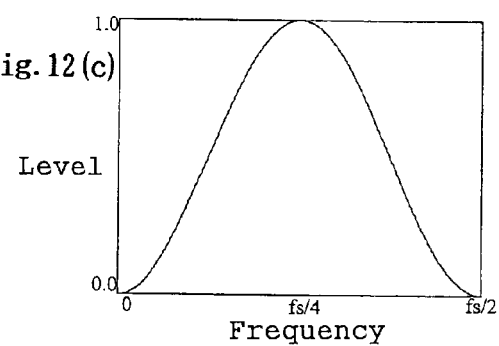
Figure 12:
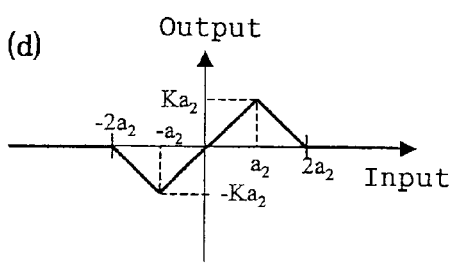
Figure 12:
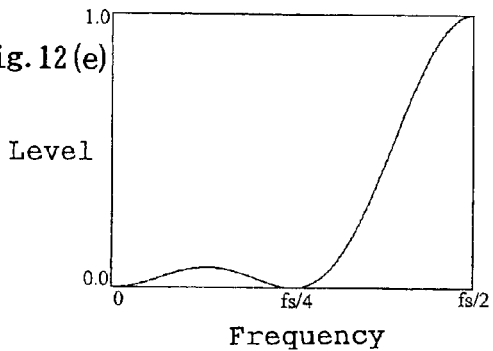
Figure 12:
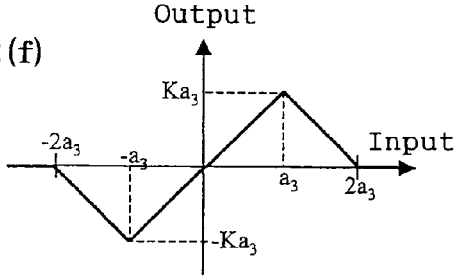

The operation of the nonlinear processing circuits 62-1 to 62-n will be described in detail. FIG. 12 shows the frequency characteristics of the BPFs 61-1 to 61-3 when n=3, and the input/output characteristics of the nonlinear processing circuits 62-1 to 62-3 for the outputs thereof. FIG. 12(a) shows the frequency characteristic of the BPF 61-1, and FIG. 12(b) shows the input/output characteristic of the nonlinear processing circuit 62-1. FIG. 12(*c*) shows the frequency characteristic of the BPF 61-2, and FIG. 12(*d*) shows the input/output characteristic of the nonlinear processing circuit 62-2. FIG. 12(*e*) shows the frequency characteristic of the BPF 61-3, and FIG. 12(*f*) shows the input/output characteristic of the nonlinear processing circuit 62-3. As shown in FIG. 12, a relationship a1<a2<a3 holds among the magnitudes of the characteristic parameters a1 to a3. That is, the values of the characteristic parameters assigned to the plurality of nonlinear processing circuits are set so as to be different from one another in accordance with the height of the spatial frequency band of the signal processed by the corresponding nonlinear processing circuit and so as to increase as the frequency band increases. As an example, when compared with the characteristic parameter a in the first embodiment, a1<a, a2≈a, and a3>a. The characteristic parameters a1 to a3 correspond to the third characteristic parameter of the present invention.

This is for the following reason: As described in the first embodiment, the noise included in the video signal is more largely distributed in a high frequency region than in a low frequency region in the spatial frequency, in the nonlinear processing circuit 62-1 receiving low frequency components including more motion components than noise, by setting the characteristic parameter a1 to a low value, reduction of the motion components is more suppressed than noise reduction. In the nonlinear processing circuit 62-3 receiving high frequency components including more noise components than motion components, by setting the characteristic parameter a3 to a high value, higher priority is placed on reduction of noises having a somewhat large amplitude. In the nonlinear processing circuit 62-2 receiving midrange frequency components including both motion components and noise components to the same extent, the characteristic parameter a2 is controlled so as to take a value somewhere between a1 and a3.

By providing the above-described structure, even if the factor of amplification of the AGC circuit 12 becomes not less than a predetermined value, for example not less than G1 or G2, to cause after-image degradation in the output video signal SO, noise can be reduced while after-image degradation is more improved than in the first embodiment.

While a structure in which the BPFs 61-1 to 61-n, the nonlinear processing circuits 62-1 to 62-n and the adder 63 are added to the structure of the first embodiment is described in the above, the high frequency coring circuit 14 may be omitted. That is, the present invention may be carried out with the nonlinear circuit 105 of the conventional example shown in FIG. 9 being replaced with the BPFs 61-1 to 61-n, the nonlinear processing circuits 62-1 to 62-n and the adder 63.

While in the first and second embodiments, when the factor of amplification is increased to not less than G1, the characteristic parameter a is controlled so as to gradually increase in accordance with the factor of amplification, for example as shown in FIG. 5(*c*), the present invention is not limited thereto; for example as shown in FIG. 5(*d*), the parameter a may be previously set to a fixed value irrespective of the factor of amplification. This value is of a level such that although an after-image is slightly generated when the factor of amplification of the AGC circuit 12 is low, that does not leads to image quality degradation and causes no problem. Further, even if the factor of amplification becomes higher than G1, since the characteristic parameter is fixed, the after-image does not become large and image quality does not degrade.

While the characteristic parameter m is also gradually increased in accordance with the factor of amplification of the AGC circuit 12 in the above description, the present invention is not limited thereto; the characteristic parameter m may be set to a fixed value with which a predetermined effect is obtained, in consideration of the factor of amplification of the AGC circuit 12.

Figure 7A:
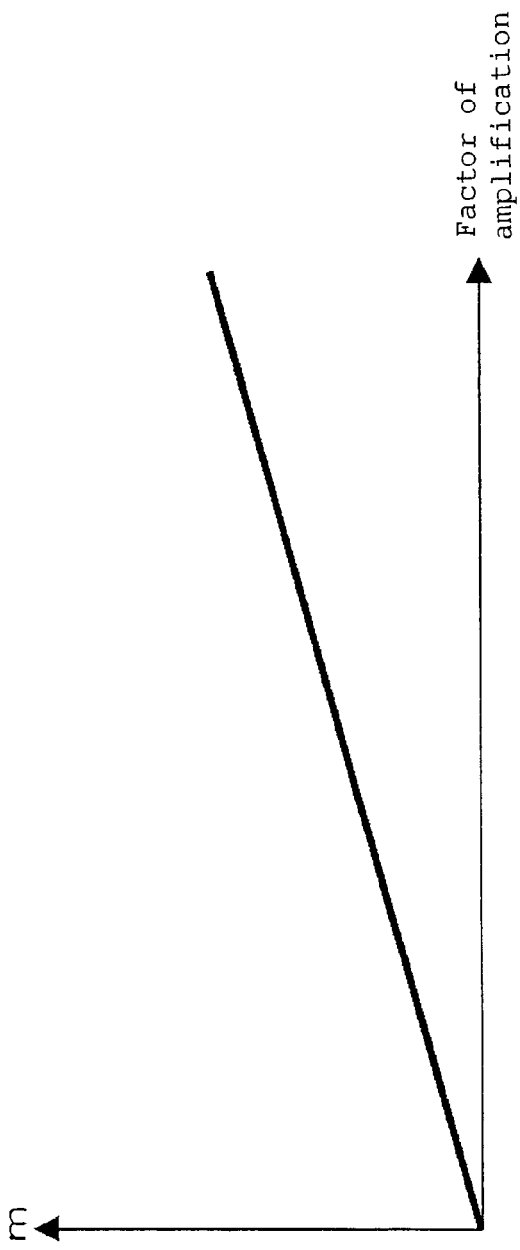
FIG. 7(a) is a relational view showing another example of the relationship between the value of a characteristic parameter "m" and the factor of amplification of the AGC circuit in the first and second embodiments of the present invention.
Figure 7B:
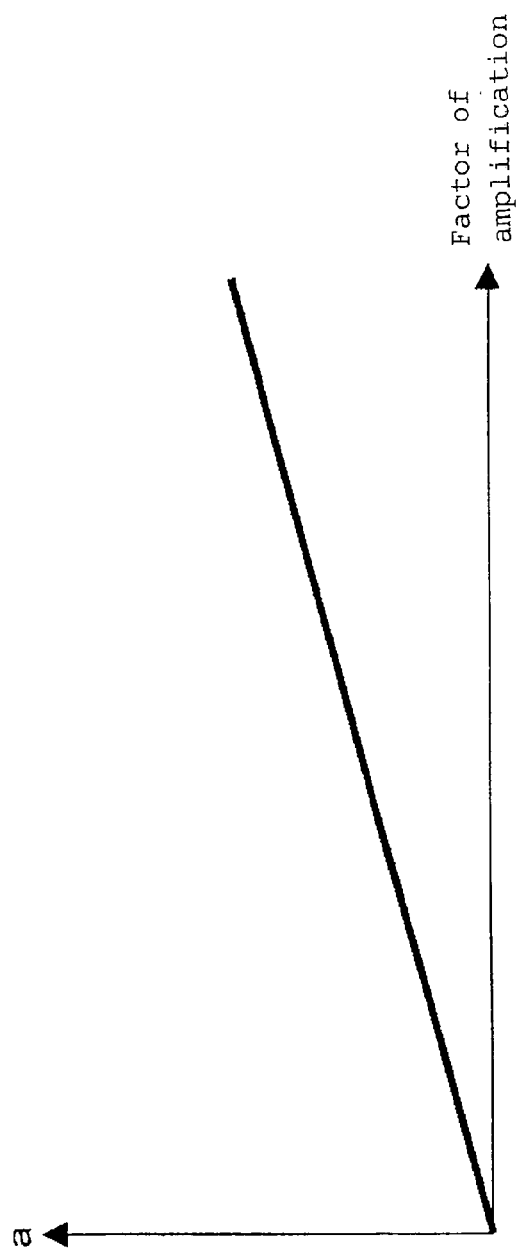
FIG. 7(b) is a relational view showing another example of the relationship between the value of a characteristic parameter "a" and the fact or of amplification of the AGC circuit 12 in the first and second embodiments of the present invention.
Figure 11:
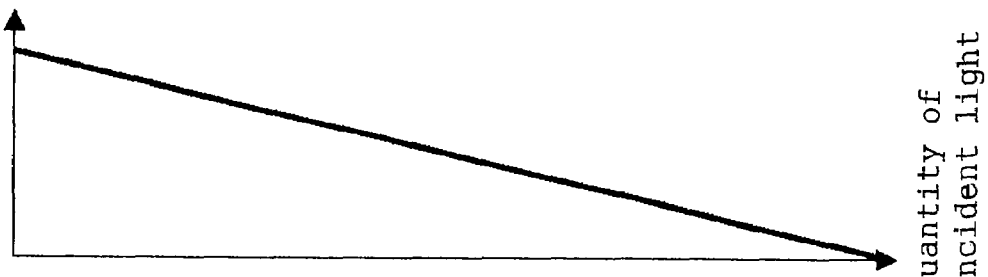
FIG. 11(a) is a view showing the relationship between the level of the CCD output signal and the quantity of the incident light in the first embodiment of the present invention.
FIG. 11(b) is a relational view showing another example of the relationship between the value of the characteristic parameter of the nonlinear processing circuit and the factor of amplification of the AGC circuit in the first embodiment of the present invention.
FIG. 11(c) is a relational view showing another example of the relationship between the value of the characteristic parameter of the coring circuit and the factor of amplification of the AGC circuit in the first embodiment of the present invention.
Figure 11:
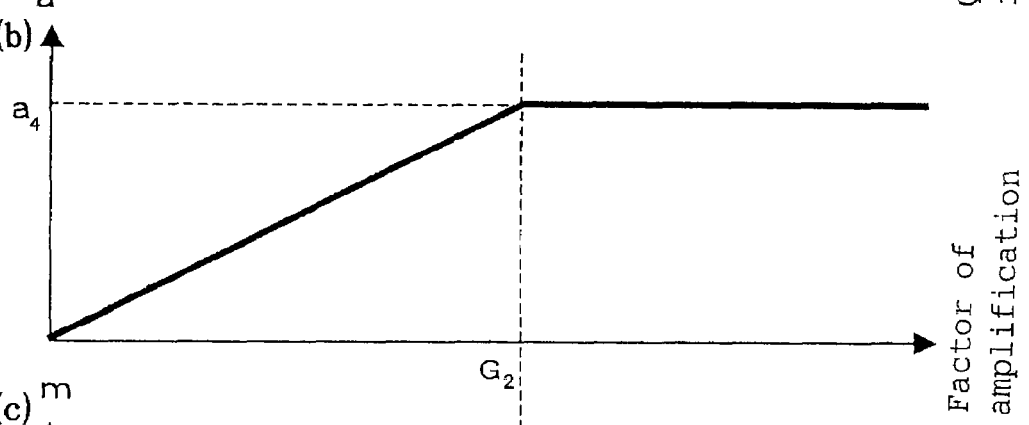
Figure 11:
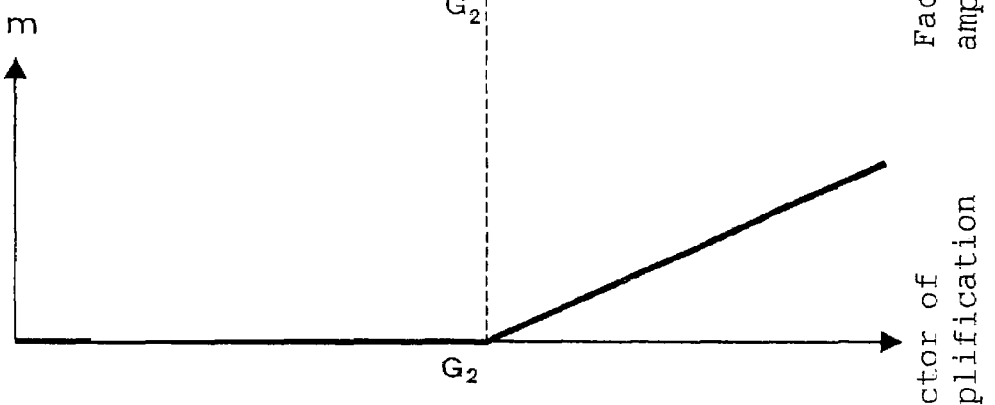

Further, while the control of the characteristic parameters a and m is stepwisely performed as shown in FIGS. 5 and 11 in the first embodiment, the present invention is not limited thereto; for example as shown in FIG. 7, the characteristic parameters m and a may be increased at the same time. By setting the inclinations of the straight lines in FIG. 7(*a*)(*b*) to appropriate values lower than those shown in FIGS. 5 or 11, detail degradation can be suppressed while after-image degradation is maintained at a level somewhere between those of the conventional example and the first embodiment.

While in the first and second embodiments, the characteristic of the nonlinear processing circuits 16 and 62-1 to 62-n is the same as that of the conventional noise reducing device as shown in FIG. 10, the present invention is not limited thereto; in short, the characteristic is set to one such that only the part, with a small amplitude, of the output signal of the subtracter 15 can be extracted based on a comparison between the level of the output signal of the subtracter 15 and the value of the characteristic parameter a.

Figure 8:
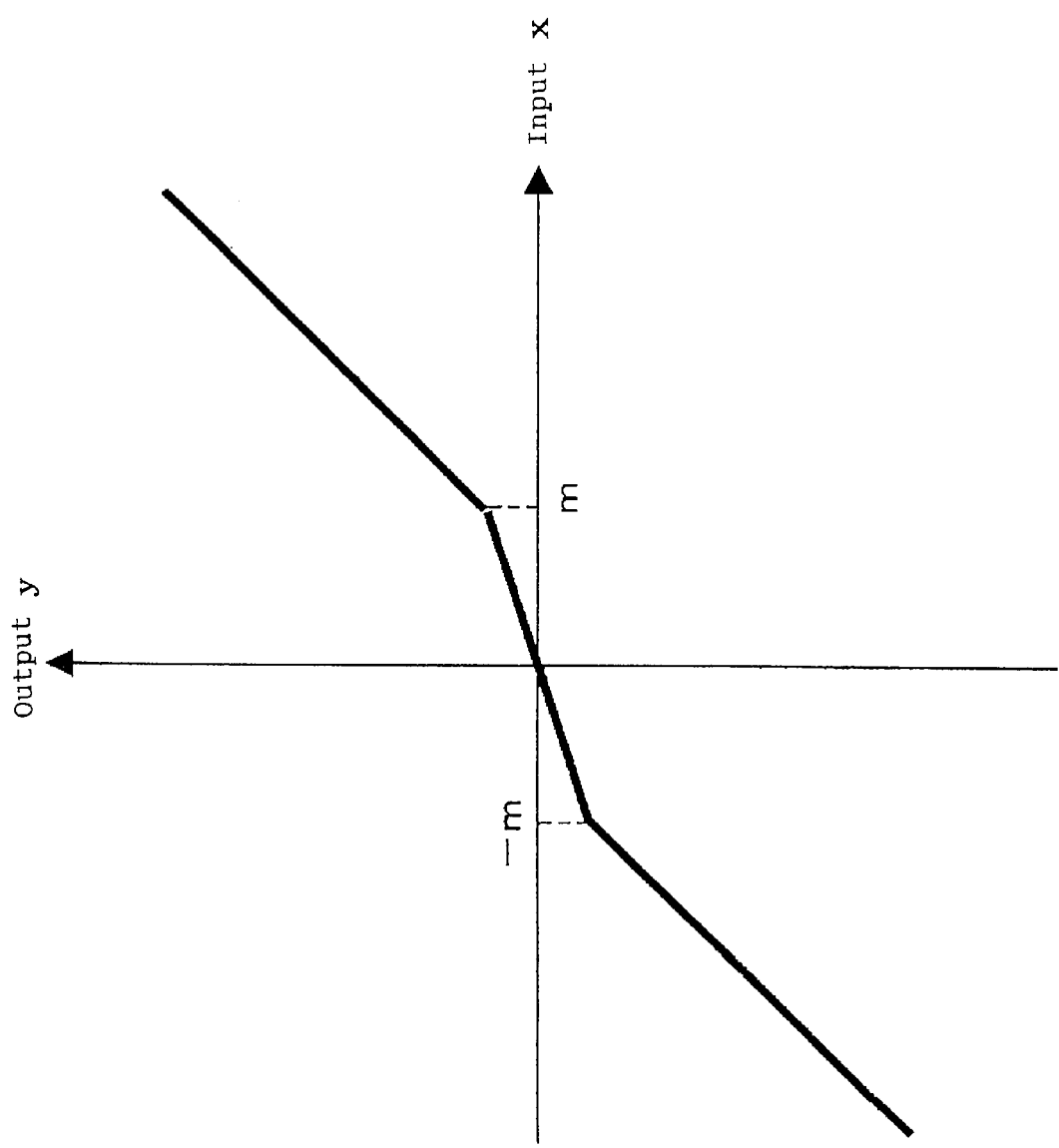
FIG. 8 is an input/output characteristic view showing another example of the input/output characteristic of the coring circuit used in the first and second embodiments of the present invention.

While the coring circuit 23 having a characteristic as shown in FIG. 4 is used as the nonlinear processing circuit in the high frequency coring circuit 14, the present invention is not limited thereto; for example, the characteristic may be as shown in FIG. 8. According to this characteristic, although some noise components are left since high frequency signals of levels not more than the absolute value m do not completely become nonexistent, detail signals with a small amplitude can be left accordingly.

Moreover, while the high frequency coring circuit 14 has the structure shown in FIG. 2, the present invention is not limited thereto; in short, the high frequency coring circuit 14 has a structure such that nonlinear processing can be performed on the high frequency region of the video signal.

While the high frequency coring circuit 14 of the first embodiment has two filters, the HPF 21 and the LPF 22, the number of HPFs and the number of LPFs may each be more than one. Moreover, it may be implemented by a plurality of BPFs of different pass bands.

While the above-described second embodiment has a plurality of BPFs 61-1, 61-2 to 62-n, it may be implemented as a combination of a plurality of HPFs and LPFs.

Further, the video signal noise reducing means and the difference signal noise reducing means of the present invention are not limited to the high frequency coring circuit 14 and the nonlinear processing circuits 16 and 62-1 to 62-n, they may be implemented by a structure such that the level of the input signal is reduced by given processing.

Moreover, while the field memory is used as the means of storing the output video signal SO as the reference signal of the present invention, the present invention is not limited thereto; it is needless to say that a frame memory, for example, may be used.

Moreover, while the field memory 18 inputs the output video signal SO of the immediately preceding field to the subtracter 15 in the first and second embodiments, as the reference signal of the present invention, the output video signal SO of a field preceding the immediately preceding field may be used.

Moreover, the present invention may be implemented as an image forming apparatus provided with the above-described noise reducing device of the present invention and another image forming means capable of obtaining video signals such as a CCD or a CMOS, and examples of such an image forming apparatus include video cameras for home use and for professional use, digital cameras having a moving image taking function, mobile telephones, personal digital assistants and personal computers.

Moreover, the program according to the present invention may be a program of causing a computer to perform functions of all or some of the means of the above-described noise reducing device of the present invention, said program operating in cooperation with the computer.

Moreover, the present invention may be a recording medium holding a program of causing a computer to perform all or some of the functions of all or some of the means of the above-described noise reducing device of the present invention, said recording medium being computer-readable and said program that is read out performing the functions in cooperation with the computer.

The above-mentioned "some of the means" of the present invention means some means of the plural means, or means the operations of some functions of one means.

Moreover, a computer-readable recording medium on which the program of the present invention is recorded is also included in the present invention.

Moreover, a usage of the program of the present invention may be such that the program is recorded on a computer-readable recording medium and operates in cooperation with a computer.

Moreover, a usage of the program of the present invention may be such that the program is transmitted over a transmission medium, is read out by a computer and operates in cooperation with the computer.

Moreover, the recording medium includes ROMs, and the transmission medium includes: transmission media such as the Internet; light; radio waves; and sound waves.

Moreover, the above-mentioned computer of the present invention is not limited to pure hardware such as a CPU, but may include firmware, an OS, and peripherals.

As described above, the structure of the present invention may be implemented either via software or via hardware.

INDUSTRIAL APPLICABILITY

As described above, according to the present invention, a noise reducing device, a noise reducing method and the like can be provided where noise is effectively reduced and after-image degradation is small even when the S/N ratio of the video signal is degraded and it is necessary to amplify the video signal.

The invention claimed is:

1. A noise reducing device comprising:
amplifying means of amplifying a video signal;
video signal level reducing means of splitting the video signal amplified by the amplifying means into a plurality of bands in accordance with a spatial frequency thereof, reducing a level of a higher frequency component of the video signal based on a comparison between a first characteristic parameter based on an factor of amplification of the amplifying means and the level of the higher frequency component, and synthesizing the reduced higher frequency component and a component of another band with each other;
difference signal extracting means of extracting a difference signal between an output of the video signal reducing means and a predetermined reference signal;
difference signal level reducing means of reducing a level of the difference signal; and
subtracting means of subtracting an output of the difference signal level reducing means from the output of the video signal level reducing means,
wherein an output of the subtracting means is outputted as the video signal whose noise has been reduced, and is used as a new reference signal,
wherein the level of the difference signal is reduced based on a comparison between the level of the difference signal and a predetermined second characteristic parameter,
wherein the second characteristic parameter of the difference signal level reducing means varies in accordance with the factor of amplification of the amplifying means,
wherein when the factor of amplification of the amplifying means is not more than a predetermined value, the second characteristic parameter of the difference signal level reducing means is maintained fixed, and the first characteristic parameter of the video signal level reducing means is increased, and
wherein when the factor of amplification is higher than the predetermined value, the first characteristic parameter of the video signal level reducing means is maintained fixed, and the second characteristic parameter of the difference signal level reducing means is increased.

2. A noise reducing device comprising:
amplifying means of amplifying a video signal;
video signal level reducing means of splitting the video signal amplified by the amplifying means into a plurality of bands in accordance with a spatial frequency thereof, reducing a level of a higher frequency component of the video signal based on a comparison between a first characteristic parameter based on an factor of amplification of the amplifying means and the level of the higher frequency component, and synthesizing the reduced higher frequency component and a component of another band with each other;
difference signal extracting means of extracting a difference signal between an output of the video signal reducing means and a predetermined reference signal;
difference signal level reducing means of reducing a level of the difference signal; and
subtracting means of subtracting an output of the difference signal level reducing means from the output of the video signal level reducing means,
wherein an output of the subtracting means is outputted as the video signal whose noise has been reduced, and is used as a new reference signal,
wherein the level of the difference signal is reduced based on a comparison between the level of the difference signal and a predetermined second characteristic parameter,
wherein the second characteristic parameter of the difference signal level reducing means varies in accordance with the factor of amplification of the amplifying means,
wherein when the factor of amplification of the amplifying means is not more than a predetermined value, the first characteristic parameter of the video signal level reducing means is maintained fixed, and the second characteristic parameter of the difference signal level reducing means is increased, and
wherein when the factor of amplification is higher than the predetermined value, the second characteristic parameter of the difference signal level reducing means is maintained fixed, and the first characteristic parameter of the video signal level reducing means is increased.

3. A noise reducing device comprising:
amplifying means of amplifying a video signal;
video signal level reducing means of splitting the video signal amplified by the amplifying means into a plurality of bands in accordance with a spatial frequency thereof, reducing a level of a higher frequency component of the video signal based on a comparison between a first characteristic parameter based on an factor of amplification of the amplifying means and the level of the higher frequency component, and synthesizing the reduced higher frequency component and a component of another band with each other;

difference signal extracting means of extracting a difference signal between an output of the video signal reducing means and a predetermined reference signal;

difference signal level reducing means of reducing a level of the difference signal; and subtracting means of subtracting an output of the difference signal level reducing means from the output of the video signal level reducing means, wherein an output of the subtracting means is outputted as the video signal whose noise has been reduced, and is used as a new reference signal, wherein the video signal level reducing means comprises:

a plurality of filters including a low pass filter and a high pass filter and frequency-dividing the video signal;

a coring circuit receiving an output from the high pass filter, cutting the output when a level of the output is not more than the first characteristic parameter, and reducing the level when the level is higher than the first parameter; and synthesizing means of synthesizing an output of the low pass filter and an output of the coring circuit with each other.

4. A noise reducing device comprising:

amplifying means of amplifying a video signal;

video signal level reducing means of splitting the video signal amplified by the amplifying means into a plurality of bands in accordance with a spatial frequency thereof, reducing a level of a higher frequency component of the video signal based on a comparison between a first characteristic parameter based on an factor of amplification of the amplifying means and the level of the higher frequency component, and synthesizing the reduced higher frequency component and a component of another band with each other;

difference signal extracting means of extracting a difference signal between an output of the video signal reducing means and a predetermined reference signal;

difference signal level reducing means of reducing a level of the difference signal; and subtracting means of subtracting an output of the difference signal level reducing means from the output of the video signal level reducing means, wherein an output of the subtracting means is outputted as the video signal whose noise has been reduced, and is used as a new reference signal, wherein the video signal level reducing means comprises:

a plurality of band pass filters frequency-dividing the video signal;

a coring circuit receiving an output of, of the plurality of band pass filters, a band pass filter whose pass band is a high frequency region, cutting the output when a level of the output is not more than the first characteristic parameter, and reducing the level when the level is higher than the first parameter; and synthesizing means of synthesizing an output of, of the plurality of band pass filters, a band pass filter whose pass band is a low frequency region and an output of the coring circuit with each other.

5. A noise reducing device comprising:

amplifying means of amplifying a video signal;

video signal level reducing means of splitting the video signal amplified by the amplifying means into a plurality of bands in accordance with a spatial frequency thereof, reducing a level of a higher frequency component of the video signal based on a comparison between a first characteristic parameter based on an factor of amplification of the amplifying means and the level of the higher frequency component, and synthesizing the reduced higher frequency component and a component of another band with each other;

difference signal extracting means of extracting a difference signal between an output of the video signal reducing means and a predetermined reference signal;

difference signal level reducing means of reducing a level of the difference signal; and subtracting means of subtracting an output of the difference signal level reducing means from the output of the video signal level reducing means, wherein an output of the subtracting means is outputted as the video signal whose noise has been reduced, and is used as a new reference signal, wherein the video signal is inputted every n-th field or n-th horizontal period (n is a natural number), and the difference signal corresponding to an m-th video signal that is inputted is obtained by using as the predetermined reference signal a signal obtained at least based on an (m−1)-th video signal that is inputted.

6. A noise reducing device comprising:

amplifying means of amplifying a video signal;

video signal level reducing means of splitting the video signal amplified by the amplifying means into a plurality of bands in accordance with a spatial frequency thereof, reducing a level of a higher frequency component of the video signal based on a comparison between a first characteristic parameter based on an factor of amplification of the amplifying means and the level of the higher frequency component, and synthesizing the reduced higher frequency component and a component of another band with each other;

difference signal extracting means of extracting a difference signal between an output of the video signal reducing means and a predetermined reference signal;

difference signal level reducing means of reducing a level of the difference signal; and subtracting means of subtracting an output of the difference signal level reducing means from the output of the video signal level reducing means, wherein an output of the subtracting means is outputted as the video signal whose noise has been reduced, and is used as a new reference signal, wherein the difference signal level reducing means splits the difference signal into a plurality of bands in accordance with the spatial frequency thereof, reduces for each of the bands a level of a higher frequency signal of the plurality of difference signals based on a comparison between a level of the difference signal and a predetermined third characteristic parameter determined for each of the bands, and combines the split bands together to obtain the output.

7. A noise reducing device comprising:

amplifying means of amplifying a video signal;

video signal level reducing means of splitting the video signal amplified by the amplifying means into a plurality of bands in accordance with a spatial frequency thereof, reducing a level of a higher frequency component of the video signal based on a comparison between a first characteristic parameter based on an factor of amplification of the amplifying means and the level of the higher frequency component, and synthesizing the reduced higher frequency component and a component of another band with each other;

difference signal extracting means of extracting a difference signal between an output of the video signal reducing means and a predetermined reference signal;

difference signal level reducing means of reducing a level of the difference signal; and subtracting means of subtracting an output of the difference signal level reducing means from the output of the video signal level reducing means, wherein an output of the subtracting means is outputted as the video signal whose noise has been reduced, and is used as a new reference signal, wherein the difference signal level reducing means splits the difference signal into a plurality of bands in accordance with the spatial frequency thereof, reduces for each of the bands a level of a higher frequency signal of the plurality of difference signals based on a comparison between a level of the difference signal and a predetermined third characteristic parameter determined for each of the bands, and combines the split bands together to obtain the output, a plurality of filters frequency-dividing the video signal level reducing means;

a plurality of level reducing means reducing a level of an output of each of the plurality of filters based on a comparison with the third characteristic parameter of each of the level reducing means; and synthesizing means synthesizing an output of the plurality of level reducing means, wherein values of the third characteristic parameters of the plurality of level reducing means are higher as pass bands of the plurality of filters to which the corresponding ones of the plurality of level reducing means are connected are higher.

8. A noise reducing device comprising:

amplifying means of amplifying a video signal;

video signal level reducing means of splitting the video signal amplified by the amplifying means into a plurality of bands in accordance with a spatial frequency thereof, reducing a level of a higher frequency component of the video signal based on a comparison between a first characteristic parameter based on an factor of amplification of the amplifying means and the level of the higher frequency component, and synthesizing the reduced higher frequency component and a component of another band with each other;

difference signal extracting means of extracting a difference signal between an output of the video signal reducing means and a predetermined reference signal;

difference signal level reducing means of reducing a level of the difference signal; and subtracting means of subtracting an output of the difference signal level reducing means from the output of the video signal level reducing means, wherein an output of the subtracting means is outputted as the video signal whose noise has been reduced, and is used as a new reference signal, wherein the difference signal level reducing means splits the difference signal into a plurality of bands in accordance with the spatial frequency thereof, reduces for each of the bands a level of a higher frequency signal of the plurality of difference signals based on a comparison between a level of the difference signal and a predetermined third characteristic parameter determined for each of the bands, and combines the split bands together to obtain the output, a plurality of filters frequency-dividing the video signal level reducing means;

a plurality of level reducing means reducing a level of an output of each of the plurality of filters based on a comparison with the third characteristic parameter of each of the level reducing means; and synthesizing means synthesizing an output of the plurality of level reducing means, wherein values of the third characteristic parameters of the plurality of level reducing means are higher as pass bands of the plurality of filters to which the corresponding ones of the plurality of level reducing means are connected are higher, wherein the plurality of filters are band pass filters having different pass bands.

9. A noise reducing device comprising:

amplifying means of amplifying a video signal;

video signal level reducing means of splitting the video signal amplified by the amplifying means into a plurality of bands in accordance with a spatial frequency thereof, reducing a level of a higher frequency component of the video signal based on a comparison between a first characteristic parameter based on an factor of amplification of the amplifying means and the level of the higher frequency component, and synthesizing the reduced higher frequency component and a component of another band with each other;

difference signal extracting means of extracting a difference signal between an output of the video signal reducing means and a predetermined reference signal;

difference signal level reducing means of reducing a level of the difference signal; and subtracting means of subtracting an output of the difference signal level reducing means from the output of the video signal level reducing means, wherein an output of the subtracting means is outputted as the video signal whose noise has been reduced, and is used as a new reference signal, wherein the difference signal level reducing means splits the difference signal into a plurality of bands in accordance with the spatial frequency thereof, reduces for each of the bands a level of a higher frequency signal of the plurality of difference signals based on a comparison between a level of the difference signal and a predetermined third characteristic parameter determined for each of the bands, and combines the split bands together to obtain the output, a plurality of filters frequency-dividing the video signal level reducing means;

a plurality of level reducing means reducing a level of an output of each of the plurality of filters based on a comparison with the third characteristic parameter of each of the level reducing means; and synthesizing means synthesizing an output of the plurality of level reducing means, wherein values of the third characteristic parameters of the plurality of level reducing means are higher as pass bands of the plurality of filters to which the corresponding ones of the plurality of level reducing means are connected are higher wherein the plurality of filters include a low pass filter and a high pass filter.

10. A noise reducing method comprising:

an amplifying step of amplifying a video signal;

a video signal level reducing step of splitting the video signal amplified by the amplifying step into a plurality of bands in accordance with a spatial frequency thereof, reducing a level of a higher frequency component of the video signal based on a comparison between a first characteristic parameter based on an factor of amplification of the amplifying step and the level of the higher frequency component, and synthesizing the reduced higher frequency component and a component of another band with each other;

a difference signal extracting step of extracting a difference signal between an output of the video signal reducing step and a predetermined reference signal;

a difference signal level reducing step of reducing a level of the difference signal; and a subtracting step of subtracting an output of the difference signal level reducing step from the output of the video signal level reducing step, wherein an output of the subtracting step is outputted as the video signal whose noise has been reduced, and is used as a new reference signal, wherein in the difference signal level reducing step, the difference signal is split into a plurality of bands in accordance with the spatial frequency thereof, a level of a higher frequency signal of the plurality of difference signals is reduced for each of the bands based on a comparison between a level of the difference signal and a predetermined third characteristic parameter determined for each of the bands, and the split bands are combined together to obtain the output.

11. A noise reducing device comprising:

amplifying means of amplifying a video signal;

video signal level reducing means of splitting the video signal amplified by the amplifying means into a plurality of bands in accordance with a spatial frequency thereof, reducing a level of a higher frequency component of the video signal based on a comparison between a first characteristic parameter based on an factor of amplification of the amplifying means and the level of the higher frequency component, and synthesizing the reduced higher frequency component and a component of another band with each other;

difference signal extracting means of extracting a difference signal between an output of the video signal reducing means and a predetermined reference signal;

difference signal level reducing means of reducing a level of the difference signal; and subtracting means of subtracting an output of the difference signal level reducing means from the output of the video signal level reducing means, wherein an output of the subtracting means is outputted as the video signal whose noise has been reduced, and is used as a new reference signal, wherein the difference signal level reducing means splits the difference signal into a plurality of bands in accordance with the spatial frequency thereof, reduces for each of the bands a level of a higher frequency signal of the plurality of difference signals based on a comparison between a level of the difference signal and a predetermined third characteristic parameter determined for each of the bands, and combines the split bands together to obtain the output, wherein the third characteristic parameter of the difference signal level reducing means varies in accordance with the factor of amplification of the amplifying means.

12. A program causing a computer to execute the following steps:

an amplifying step of amplifying a video signal;

a video signal level reducing step of splitting the video signal amplified by the amplifying means into a plurality of bands in accordance with a spatial frequency thereof, reducing a level of a higher frequency component of the video signal based on a comparison between a first characteristic parameter based on an factor of amplification of the amplifying means and the level of the higher frequency component, and synthesizing the reduced higher frequency component and a component of another band with each other;

a difference signal extracting step of extracting a difference signal between an output of the video signal reducing means and a predetermined reference signal;

a difference signal level reducing step of reducing a level of the difference signal; and a subtracting step of subtracting an output of the difference signal level reducing step from the output of the video signal level reducing step, wherein an output of the subtracting step is outputted as the video signal whose noise has been reduced, and is used as a new reference signal, wherein in the difference signal level reducing step, the difference signal is split into a plurality of bands in accordance with the spatial frequency thereof, a level of a higher frequency signal of the plurality of difference signals is reduced for each of the bands based on a comparison between a level of the difference signal and a predetermined third characteristic parameter determined for each of the bands, and the split bands are combined together to obtain the output.

* * * * *

UNITED STATES PATENT AND TRADEMARK OFFICE
CERTIFICATE OF CORRECTION

| | |
|---|---|
| PATENT NO. | : 7,499,087 B2 |
| APPLICATION NO. | : 10/493870 |
| DATED | : March 3, 2009 |
| INVENTOR(S) | : Shuji Yano et al. |

Page 1 of 1

It is certified that error appears in the above-identified patent and that said Letters Patent is hereby corrected as shown below:

On Page 2, FOREIGN PATENT DOCUMENTS: please delete duplicate references.

"JP 6-178163    6/1994

JP 3-79168      4/1991"

Signed and Sealed this

Twenty-eighth Day of July, 2009

JOHN DOLL
*Acting Director of the United States Patent and Trademark Office*